United States Patent

Hunter et al.

[11] Patent Number: 6,110,995
[45] Date of Patent: *Aug. 29, 2000

[54] PROCESS FOR PREPARING NOVEL HIGH SOLIDS NON-AQUEOUS POLYMER COMPOSITIONS

[75] Inventors: Wood E. Hunter, Pittsburgh; Kevin W. Frederick, Wexford; Randy J. Loeffler, Carnegie, all of Pa.

[73] Assignee: Calgon Corporation, Pittsburgh, Pa.

[ * ] Notice: This patent issued on a continued prosecution application filed under 37 CFR 1.53(d), and is subject to the twenty year patent term provisions of 35 U.S.C. 154(a)(2).

[21] Appl. No.: 08/273,688

[22] Filed: Jul. 12, 1994

Related U.S. Application Data

[63] Continuation of application No. 07/993,800, Dec. 21, 1992, abandoned.

[51] Int. Cl.[7] .................................................. C08J 3/11
[52] U.S. Cl. ...................... 523/335; 210/787; 210/789; 523/342; 523/343; 528/502 D
[58] Field of Search ................... 210/787, 789; 523/335, 342, 343; 528/502 D

[56] References Cited

U.S. PATENT DOCUMENTS

| | | | |
|---|---|---|---|
| 4,059,554 | 11/1977 | Pacansky | 524/556 |
| 4,803,264 | 2/1989 | Krijnen et al. | 836/114 |
| 4,944,888 | 7/1990 | Mallya et al. | 210/787 |
| 5,155,156 | 10/1992 | Scanley | 524/366 |
| 5,269,941 | 12/1993 | Chave et al. | 210/787 |

OTHER PUBLICATIONS

Chem. Abstracts, vol. 98, No. 26, Jun. 27, 1983, Abs. No. 216505q Water Absorbing Polymers Powder, p. 36.

Kirk–Othmer, *Concise Encyclopedia of Chemical Technology*, Wiley & Sons, New York, NY, 1985, p. 235.

*Primary Examiner*—Andrew E. C. Merriam
*Attorney, Agent, or Firm*—Michael B. Martin; Thomas M. Breininger

[57] ABSTRACT

The use of falling-film evaporation and a concentration means such as centrifugal separation to dehydrate and concentrate a water-in-oil polymer emulsion or suspension is disclosed. In a preferred embodiment, a water-in-oil polymer composition containing less than about 25% active polymer solids is dehydrated in falling-film evaporator to produce an evaporator concentrate containing less than about 5.0% water. The evaporator concentrate then flows to a separation device such as a centrifuge, wherein oil is removed to produce a composition that is substantially a polymer and emulsifying surfactant-in-oil composition containing in excess of about 60 weight % polymer solids. The centrifuge raffinate may optionally be treated in a second separation means to capture additional polymer solids, with optional recycle of the oil-rich raffinate. The concentrated polymer composition is preferably stabilized with a steric stabilizer to produce a free flowing liquid product.

14 Claims, 1 Drawing Sheet

PROCESS FOR PREPARING NOVEL HIGH SOLIDS NON-AQUEOUS POLYMER COMPOSITIONS

This is a continuation, of application Ser. No. 07/993,800 filed Dec. 21, 1992 now abandoned.

BACKGROUND OF THE INVENTION

Water soluble polymers can be prepared in several forms. For instance, it is known in the art that water-soluble polymers can be dispersed into the oil phase of water-in-oil emulsions. Conventional emulsion polymerization techniques generally involve either:

(1) forming a water-in-oil emulsion of an aqueous solution of at least one water-soluble ethylenically unsaturated monomer in an inert hydrophobic liquid organic dispersion medium and polymerizing said monomer or monomers in said dispersion medium to form a polymer emulsion; or (2) forming a water soluble polymer and then emulsifying the polymer solids into an emulsion having a hydrophobic liquid as the continuous phase.

In such polymerization methods, virtually any water soluble monomer containing a $CH_2=C$ functional group can be polymerized and dispersed into a water-in-oil system. Thus, anionic, cationic, nonionic and amphoteric emulsion polymers can be prepared by conventional emulsion polymerization techniques.

Water-in-oil emulsions are generally comprised of three primary components including: (1) a hydrophobic phase; (2) an aqueous phase; and (3) a surfactant system. The hydrophobic phase generally comprises from about 5 to about 75%, by weight, of the emulsion. Any inert hydrophobic liquid can be used as the hydrophobic phase. Preferred hydrophobic liquids, for example, are selected from the group consisting of benzene, xylene, toluene, mineral oils, kerosene, napthas, petroleums, and blends of aromatic and aliphatic hydrocarbons containing 4 or greater carbon atoms. Particularly preferred hydrophobic liquids are those selected from the group consisting of a narrow fraction of a branch-chain hydrocarbon sold by Witco Chemical Company under the tradename Kensol 61® and branch-chain isoparafinic hydrocarbons sold by Exxon under the tradename Isopar®.

The aqueous phase generally comprises from about 25 to about 95%, by weight, of the emulsion. This phase comprises the desired ethylenically unsaturated monomer or monomers and water. Additionally, this phase may contain an effective amount of a chelating agent, such as a sodium salt of ethylene diamine tetracetic acid (EDTA) or nitrilotriacetate (NTA), buffers, chain transfer agents or other additives. The monomer(s) to be polymerized generally comprise about 10 to about 60%, by weight, of the aqueous phase, with the balance being primarily water.

The surfactant system generally comprises about 0.5 to about 20%, by weight, of the emulsion. Any surfactant system which effectively disperses an aqueous phase into a hydrophobic phase can be used. See, for example, U.S. Pat. No. 3,826,771, which discloses the use of sorbitan monooleate as water-in-oil emulsifying agent; U.S. Pat. No. 3,278,506, which discloses the use of ethylene oxide condensates of fatty acid amides as emulsifiers; U.S. Pat. No. 3,284,393, which discloses the use of hexadecyl sodium pthalate, sorbitan monooleate, sorbitan monostearate, cetyl or stearyl sodium pthalate and metal soaps as water-in-oil emulsifiers; and U.S. Pat. No. 4,024,097, which discloses the use of surfactant systems comprising an oil-soluble alkanolamide, such as Witcamide® 511, which is commercially available from Witco Chemical Company, and one or more co-emulsifiers selected from the group consisting of unesterified dialkanol fatty amides, quaternized ammonium salts of fatty tertiary amines, salts of fatty tertiary amines, alkaline metal salts of fatty acids and alkyl or alkylaryl sulfates or sulfonates.

U.S. Pat. Nos. 4,672,090 and 4,772,659 disclose a surfactant system which comprises 25 to 85%, by weight, an oil-soluble alkanolamide; 5 to 35%, by weight, a polyoxyethylene derivative of a sorbitan ester; and 0 to 50%, by weight, sorbitan monooleate. Additionally, other surfactants, such as sorbitan monostearate, may be used in combination with these primary surfactants.

Emulsion polymers are generally produced by first mixing the surfactant system with the hydrophobic phase. The aqueous phase is then typically prepared by adding the monomer(s) to water in the desired concentration. Additionally, a chelant, such as a sodium salt of EDTA, may be added to the aqueous solution and the pH of the aqueous phase may be adjusted to between about 3.0 and 10.0, depending on the monomer(s) used. The aqueous monomer phase is then added to the mix containing the hydrophobic liquid and the surfactant system. The surfactant system enables the aqueous phase, which contains the monomer or monomers to be polymerized, to be emulsified into the hydrophobic phase. Polymerization is then carried out in the presence of a free radical generating catalyst, and the temperature of the reaction mixture is generally maintained between about 5° and about 100° C., preferably between about 20° and about 50° C., resulting in water-in-oil emulsion polymer. Any type of free radical initiator can be used, including, for example persulfate and azo initiators. High energy irradiation can also be used to initiate polymerization.

The following patents provide further background relative to the manufacture of emulsion polymers.

U.S. Pat. No. 3,041,318 discloses emulsifying an aqueous dispersion of a polymer prepared from a compound containing a $CH_2=C$ group into a water-in-oil emulsion, and then precipitating the polymer therefrom as discrete particles.

U.S. Pat. No. 3,284,393 discloses a water-in-oil emulsion polymerization process wherein a water-soluble monomer is emulsified in an oil phase and polymerized therein, resulting in a polymeric latex which is then separated from the reaction medium.

U.S. Pat. Nos. 3,624,019 (reissued and reexamined as B1 Re 28,474) and 3,734,873 (reissued and reexamined as B1 Re 28,576) disclose the preparation of water-in-oil emulsions of vinyl addition polymers using various surfactants, particularly low HLB surfactants, as emulsifiers. The polymers are dispersed into emulsions by means of agitation. Thus, polymers which are powders or "lumplike agglomerates" are comminuted and dispersed into the oil phase using mechanical energy. The specification at column 3 states that "The invention contemplates using emulsions containing between 5–75 percent by weight with preferred emulsions having a polymer concentration within the range of 10–45% by weight. In some cases the starting emulsions are converted to suspensions due to the nature and the amount of the polymer present therein." Though purely theoretical polymer concentrations of up to 75% are recited, the activity range found in the examples is 23–37%.

U.S. Pat. No. 3,826,771 discloses "high solids" water-in-oil emulsions which have a polymer concentration between about 20 and 50%, by weight, based on emulsion weight.

This reference discloses that the method of the U.S. Pat. No. 3,041,318 cannot be used to prepare emulsions containing 20 to 50%, by weight, of a vinyl addition polymer having a molecular weight in excess of 1,000,000 because aqueous solutions cannot be prepared containing high enough concentrations of the polymer.

U.S. Pat. No. 3,888,945 discloses the use of azeotropic distillation to remove water from a suspension of an aqueous solution of a polymer in a non-polar suspending medium.

U.S. Pat. No. 3,997,492 discloses stable water-in-oil emulsion polymers which have polymer concentrations between 10 and 50%, by weight, of the emulsion.

U.S. Pat. No. 4,021,399 discloses a method for concentrating a water-in-oil emulsion polymer by distilling under vacuum while maintaining the water-to-oil phase ratio substantially equal to that of the starting latex. Though this method is stated to be useful in preparing emulsions containing up to 70%, by weight, polymer, the examples are limited to $\leq 48\%$ active polymer.

U.S. Pat. No. 4,035,317 discloses a method for preparing free-flowing solid polymer particles from water-in-oil emulsions. A hot gas stream is used for drying.

U.S. Pat. No. 4,052,353 discloses the treatment of water-in-oil emulsions via evaporation to reduce the water content thereof and to produce a polymer stable to coagulation or agglomeration. The use of falling-film evaporation is not disclosed or suggested.

U.S. Pat. No. 4,035,347 discloses a method for preparing substantially dry polymers from water-in-oil emulsions using a thin film drying technique.

U.S. Pat. No. 4,528,321 discloses the distillation of dispersions to remove water and other volatile components. Theoretical polymer concentrations as high as 85%, by weight, are disclosed. However, no examples are given showing greater than 57% polymer.

UK Pat. No. 1,482,515 discloses water-in-oil emulsions which theoretically contain up to 63% active polymer.

U.S. Pat. No. 4,506,062 discloses a reverse phase suspension polymerization process and the use of azeotropic distillation to prepare polymer dispersions in oil which theoretically contain up to 70% polymer solids. In various examples the polymer dispersions of the earlier examples are centrifuged to assess particle size range and shape. A centrifuge is used in a standard compaction test; this reference does not, however, disclose the use of a centrifuge to concentrate an emulsion. The process is believed to degrade molecular weight and solubility properties.

U.S. Pat. No. 5,155,156 discloses a process wherein the water in a polymer latex containing water and an emulsifier is evaporated, followed by separation of the dried polymer from the emulsifier via filtration or centrifugation, multiple washing steps and redispersion of the polymer into a second oil. The water content of the polymer after drying is "most preferably about 3% to 8%", and this reference does not disclose the use of falling-film evaporation to dehydrate polymer emulsions. Though 85% active polymer compositions are claimed, the maximum solids concentration obtained in the examples is 68%.

In summary, the inventors believe that the references discussed above provide a comprehensive overview of the emulsion polymerization art, but that they, alone or in combination, do not disclose or remotely suggest the instant invention. While certain of these references suggest, in purely theoretical terms, emulsions containing in excess of 70% active polymer, stable emulsions at such concentrations are simply not commercially available. This is verified by the examples of the above references, which only show the preparation of emulsion polymers containing less than about 70% active polymer.

Commercial emulsion polymer compositions contain substantial portions of water and are much less active. For example, U.S. Pat. No. 4,035,317 states that: "Two problems still existed, however, in the first place, the cost of transporting the emulsion is materially higher than if the polymer per se were being transported. Since the emulsions contain, on the average, only about 25–30% polymer, 70–75% of the material shipped is useless oil and water. Secondly, the emulsions can present a stability problem when exposed to temperatures below their freezing point."

Water soluble polymers containing in excess of about 60% solids are currently only commercially available in dry or gel form. Dry polymers are generally prepared by drying conventional solution polymers, and gels are simply high viscosity polymer solutions which can not be transported as liquids. They are generally adherent, tough, rubbery substances which retain their shape when placed on flat surfaces. Gels are not generally used in gel form but instead as dilute solutions of the polymer. Dilution methods oftentimes involve mechanical steps which result in the degradation of certain properties of the polymers, such as molecular weight.

To obtain polymers having high molecular weights and good water solubility properties, it is necessary to prevent crosslinking reactions during polymerization to the extent possible. In this respect, it is desirable to prepare polymers under relatively mild conditions, e.g., conducting polymerization reactions using relatively low monomer concentrations.

Unfortunately, aqueous solution polymerization techniques which use low monomer concentrations require that the resulting solution polymers be dried to prepare powdered polymers, thus resulting in increased manufacturing costs and degradation of polymer properties such as molecular weight and solubility.

Though there is a long felt need in industry for stable, high molecular weight, soluble, easily handled polymer delivery systems containing in excess of 70% active polymer, this need has not been met because of the art's inability to efficiently concentrate liquid polymer compositions to a stable form having a high polymer content without substantially degrading the resulting high solids polymers.

Also, while dry polymers provide high activity, handling and make-down problems remain. A major benefit of the instant polymer compositions is that the economic advantages of dry polymers compared to emulsion and solution polymers can be realized along with the additional advantages associated with emulsion polymerization techniques, such as that water soluble polymers of high molecular weight are prepared in a pourable, stable liquid form. This invention advances the art of polymer preparation and delivery in that stable, pourable, high molecular weight, water soluble polymer compositions containing in excess of about 60%, preferably in excess of 70%, active polymer are now available.

It is also noteworthy that no prior art reference known to the inventors discloses or suggests: 1) the use of falling-film evaporation to dehydrate emulsion polymers, particularly to water contents of less than 3%, based on total composition weight, and 2) the use of a separation means such as a centrifuge to further concentrate a dehydrated polymer/ emulsifying surfactant/hydrophobic liquid composition produced via a falling-film evaporator into a high solids end use product. This further supports the novelty of the instant invention, which relates to the use of a falling-film evaporation and additional steps to dehydrate and concentrate starting water-in-oil emulsions, dispersions or suspensions, thereby producing non-aqueous polymer/emulsifying surfactant/hydrophobic liquid compositions containing less than about 5% water, preferably less than about 3% water, and greater than 60%, preferably greater than 70%, polymer solids.

SUMMARY OF THE INVENTION

Figure 1:
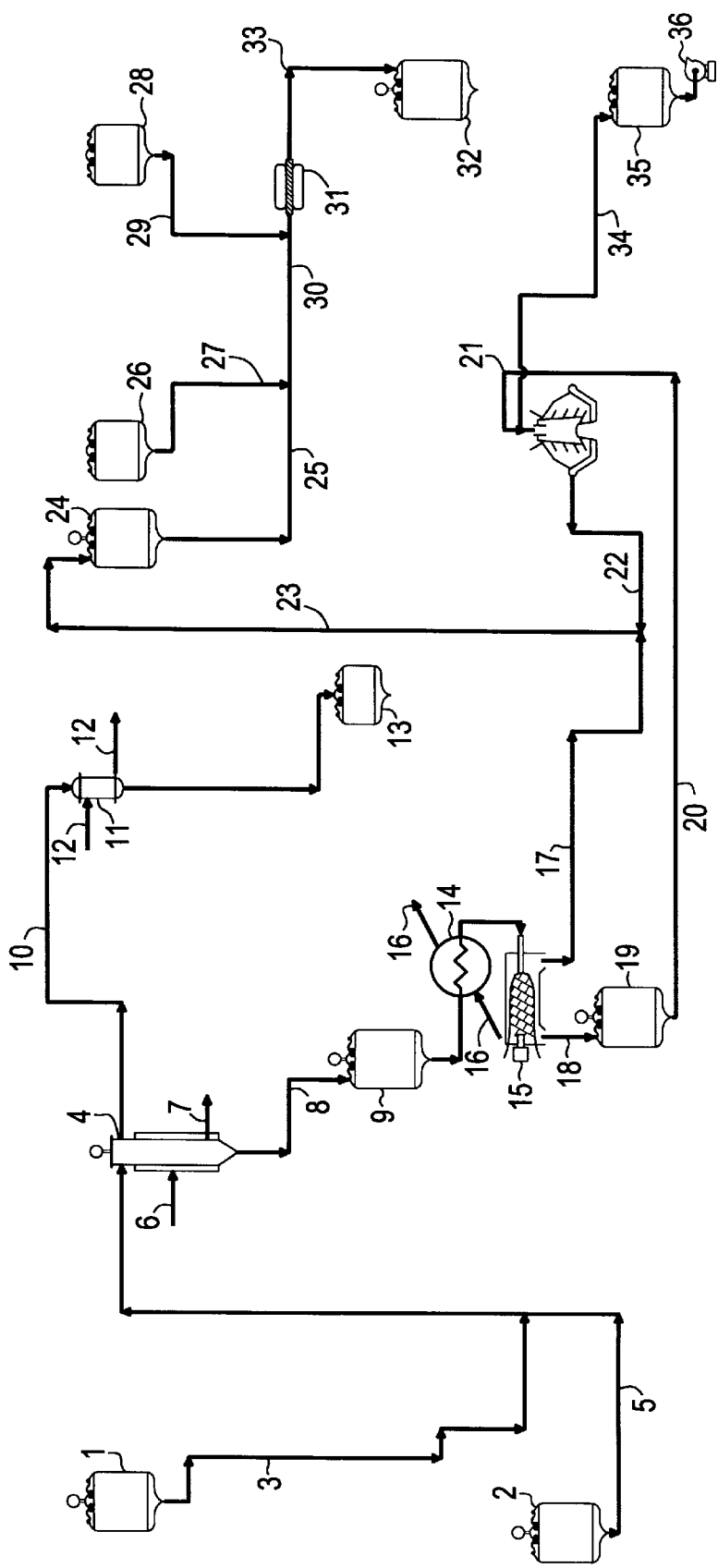
FIG. 1 shows a flow diagram illustrating the instant process for preparing non-aqueous, high solids, stable, pourable polymer emulsions/suspensions.

The instant invention relates, in general terms, to non-aqueous polymer/emulsifying surfactant/hydrophobic liquid compositions and to the preparation of such compositions via the use of falling-film evaporation and an additional separation step such as centrifugation, filtration or evaporation to dehydrate and concentrate water-in-oil polymer compositions. The resulting polymer compositions, which contain less than 5%, preferably less than 3%, more preferably less than 2%, water, and greater than 60%, preferably greater than 70% polymer solids, based on total composition weight, are pourable, stable, high solids cationic, anionic, nonionic or amphoteric polymer emulsions or suspensions which are substantially non-aqueous.

Conventional commercially available emulsions or suspensions of a water soluble polymer in a continuous oil phase generally only contain up to about 30–50 weight % polymer solids. This means that 50–70 weight % or more of such emulsions is inactive. Nonetheless, the convenience of such compositions mandates their wide use in industry.

The instant inventors have discovered that falling-film evaporators, preferably when used in conjunction with one or more separation steps for the removal of hydrophobic liquid, such as filtration, evaporation or centrifuge steps, are particularly well suited to remove water from water-in-oil polymer compositions. Because falling-film evaporators efficiently remove water from such compositions without thermally punishing the polymer contained therein, falling-film evaporation enables the preparation of stable, high solids polymer compositions which are substantially non-aqueous and which generally retain the molecular weight and solubility advantages of the starting emulsion.

Ideally, in the instant dehydration/concentration process, one starts with a water-in-oil polymer suspension, dispersion or emulsion having a polymer concentration of less than about 25%, preferably about 1 to about 15%, based on total suspension or emulsion weight. If the polymer concentration of the composition to be dehydrated and concentrated exceeds about 25%, evaporator fouling tends to become troublesome. In such cases, dilution, preferably using a suitable hydrophobic liquid, to a polymer concentration of less than about 25% is recommended. The water-in-oil polymer composition containing less than about 25% polymer solids is then dehydrated in a falling-film evaporator, wherein the water content of the composition is lowered to about 5% or less, preferably 3% or less, more preferably to between about 0.1 and about 2.5%, most preferably to between about 0.1 and about 1.5%, based on total composition weight, followed by concentration via one or more separation steps to remove hydrophobic liquid, such as centrifuge, evaporation and/or filtration steps. Centrifugal separation is preferred. Also, a steric stabilizer is preferably added to reduce the potential for compaction and/or separation of the concentrated composition.

Falling-film evaporators are used for the dehydration step of the instant process because they are believed to minimize heat punishment of the polymer composition being dehydrated. Since polymers are heat sensitive, this preserves the molecular weight and solubility properties of the starting emulsion. In a falling-film evaporator, the starting emulsion is exposed to high temperatures, preferably but not necessarily under vacuum, for relatively short periods of time. This enables falling-film evaporators to quickly flash water off of starting polymer compositions without thermally degrading the polymer or substantially effecting the stability of the starting emulsion.

After dehydration, the evaporator concentrate is treated via a second separation process, such as a filtration, evaporation or centrifugation process, to remove additional hydrophobic liquid. Preferably, the evaporator concentrate is centrifuged to produce what is substantially a polymer and emulsifier-in-oil composition containing in excess of about 60% polymer solids, preferably in excess of about 70% polymer solids, and less than about 5%, preferably less than about 3%, and more preferably less than about 2%, water. The raffinate from the centrifuge can be optionally fed to a second separation device such as a centrifuge to capture additional polymer solids, with the oil-rich raffinate stream of the second centrifuge being recycled. Finally, the polymer and emulsifying surfactant-in-oil composition produced by the centrifuge step(s) can be stabilized against compaction or separation using a stabilizer such as a steric stabilizer.

The instant process is designed to substantially increase the polymer concentration of standard commercially available emulsions, suspensions or dispersions without negatively impacting the performance of the polymer. This means that, on an active basis, the volume of material which must be handled is significantly reduced, which in turn makes the instant polymer compositions valuable in applications where standard emulsions are not suitable because of excessive storage requirements, such as off-shore oil drilling platform applications. In addition, the instant compositions compete effectively with dry polymers due to their higher molecular weights, improved performance, and comparable storage space requirements. The instant products are also believed to offer advantages over standard emulsions relative to convenience, stability, compaction, oil separation and reduced susceptibility to gel formation during storage because of the low moisture content of the material.

DETAILED DESCRIPTION OF THE INVENTION

In its broadest sense, the instant invention relates to non-aqueous, high solids polymer compositions containing less than about 5%, preferably less than about 3%, by weight, water and greater than 60%, preferably greater than about 70%, polymer solids, and to the preparation of the same through the use of falling-film evaporation and one or more separation steps, preferably centrifuge steps, to dehydrate and concentrate a starting water-in-oil polymer emulsion or suspension.

The resulting compositions, which may be emulsions, suspensions or dispersions, are stable, pourable compositions which are essentially non-aqueous and which contain in excess of 60% polymer solids and less than about 5% water, preferably in excess of 70% polymer and less than about 3% water. More preferably, these compositions contain less than 2% water.

Further, the instant invention relates to a process for removing water and increasing the polymer concentration of a water-in-oil polymer composition comprising a water soluble polymer, one or more emulsifying surfactants, water and a hydrophobic liquid, which method comprises: a) dehydrating said composition via an evaporation step to form a polymer/emulsifying surfactant/hydrophobic liquid composition, and b) centrifuging, evaporating or filtering said polymer/emulsifying surfactant/hydrophobic liquid composition to remove some portion of said hydrophobic liquid therefrom, thereby producing a concentrated polymer/emulsifying surfactant/hydrophobic liquid composition containing less than about 5%, preferably less than about 3% and more preferably less than about 2%, based on total composition weight, of water. These concentrated polymer/emulsifying surfactant/hydrophobic liquid compositions generally contain in excess of about 60% polymer solids, preferably in excess of about 70% polymer solids. Preferably, as step c), an effective amount of a steric stabilizer is added to the concentrated polymer composition to improve its stability characteristics.

The instant invention is also directed to a water soluble polymer/hydrophobic liquid/emulsifying surfactant composition or suspension which contains less than about 5%, preferably less than about 3%, water and greater than about 60% polymer solids, based on total composition weight. More preferably, these compositions contain less than about 2% water and greater than about 70% polymer, based on total composition weight.

Additionally, the instant invention is directed to a process for concentrating a starting water-in-oil polymer composition comprising: 1) about 25 to about 95%, based on total composition weight, of an aqueous phase comprising about 10 to about 60%, based on the weight of 1), of a water soluble polymer, and the balance water; 2) about 0.5 to about 20%, based on total composition weight, of at least one emulsifying surfactant; and 3) about 25 to about 95%, based on total composition weight, of a hydrophobic liquid, which method comprises: a) dehydrating said composition using an evaporator, preferably a falling-film evaporator, to produce a polymer/emulsifying surfactant/hydrophobic liquid composition which is substantially water free, i.e., which contains less than about 5%, preferably less than 3%, more preferably from about 0.1 to about 2.5% water, and most preferably from about 0.1 to about 1.5%, water; b) centrifuging said polymer/emulsifying surfactant/hydrophobic liquid composition so as to remove some portion of said hydrophobic liquid therefrom, thereby producing a concentrated polymer/emulsifying surfactant/hydrophobic liquid composition and a centrifuge raffinate, wherein said concentrated polymer/emulsifying surfactant/hydrophobic liquid composition contains less than about 5%, preferably less than about 3%, more preferably less than about 2%, water, greater than about 60%, more preferably greater than about 70%, polymer and about 0.1 to about 10% emulsifying surfactant; c) optionally treating said centrifuge raffinate in a second separation device, such as a centrifuge, filter or evaporator, preferably a centrifuge, thereby producing a second concentrated polymer composition and a second raffinate stream; d) optionally blending said second concentrated polymer composition from said second separation device with said concentrated polymer/emulsifying surfactant/hydrophobic liquid composition and recycling or disposing of said second raffinate stream; and e) optionally adding an effective amount of a steric stabilizer to the resulting concentrated composition.

In this process, the evaporator is preferably a falling-film evaporator, more preferably a thin film evaporator, the centrifuge of b) is preferably a decanter centrifuge and the centrifuge of c) is preferably a partially ejecting disk centrifuge. Also, if the polymer concentration of the starting water-in-oil polymer compositions exceeds about 25%, based on total composition weight, the starting composition is preferably diluted with a suitable hydrophobic liquid oil so as to reduce the polymer concentration to less than about 25%, preferably to between about 1 to about 15% by weight, based on total composition weight. Compositions produced by this process are also claimed.

The instant invention is further directed to a method for removing water from a water-in-oil polymer composition which comprises passing said composition through a falling-film evaporator. Thus, this invention involves the use of a falling-film evaporator to dehydrate a starting water-in-oil polymer emulsion, dispersion or suspension and to the dehydrated product produced thereby. Preferably the starting water-in-oil polymer emulsion, dispersion or suspension contains less than 25%, based on the total weight of the starting emulsion, dispersion or suspension, polymer. In cases where the starting polymer concentration is higher, a hydrophobic oil dilution step is preferred. Thin film evaporators are the most preferred type of falling-film evaporator. The products produced by falling-film evaporators preferably contain less than about 3% water, more preferably between about 0.1 and about 2.5% water, and most preferably between about 0.1 and about 1.5% water.

The instant invention also relates to a method for concentrating a dehydrated polymer composition by removing hydrophobic liquid therefrom, which comprises treating a dehydrated polymer composition (e.g., an emulsion, dispersion or suspension), particularly the dehydrated composition produced by a falling-film evaporator, in at least one concentration device such as a centrifuge, evaporator or filter, preferably a centrifuge and more preferably a decanter centrifuge, to produce a concentrated polymer/emulsifying surfactant/hydrophobic liquid composition. The resulting compositions also comprise an integral part of this invention. Preferably, the resulting composition contains in excess of about 60%, more preferably in excess of about 70%, polymer solids and less than about 5%, more preferably less than about 3%, and most preferably less than about 2%, water. Decanter centrifuges have been found by the inventors to be especially well suited to concentrate dehydrated emulsions.

Still further, the instant invention relates to the use of a second separation device such as a filter, evaporator or centrifuge, preferably a centrifuge, to concentrate the raffinate of a first centrifuge used to concentrate a polymer emulsion or suspension, which allows for additional polymer capture and oil recycle. A partially ejecting disk centrifuge is preferred for this application.

The inventors believe that any type of water-in-oil polymer composition can be concentrated by the instant process. Thus, as used herein, the term "water-in-oil polymer composition" includes virtually any water-in-oil emulsion, dispersion or suspension containing a water soluble polymer prepared from an ethylenically unsaturated monomer or monomers, wherein said polymer is a portion of an aqueous phase which is dispersed, emulsified or suspended by one or more surfactants in a system having a hydrophobic liquid as the continuous phase, and wherein the polymer comprises less than about 60%, by weight, of the composition.

The water-in-oil polymer compositions discussed herein can contain any type of water soluble polymer prepared from one or more ethylenically unsaturated monomers. Thus, the polymers may be nonionic, cationic, anionic or amphoteric. The instant invention is generally applicable, for example, to nonionic and anionic water soluble emulsions or suspensions of ethylenically unsaturated polymers prepared from, inter alia, N-vinyl pyrrolidone, N-vinyl formamide, ethoxylated acrylate and methacrylate esters such as hydroxyethyl methacrylate (HEM) and the 5, 10 and 20 mole ethoxylates of HEM, acrylamide, methacrylamide, N,N-dimethylacrylamide, N-i-propylacrylamide, N-tert-butylacrylamide, acrylic acid, α-halo acrylic acid, maleic acid or anhydride, itaconic acid, vinyl acetic acid, allyl acetic acid, methacrylic acid, acrylonitrile, vinyl sulfonic acid, allyl sulfonic acid, vinyl phosphonic acid, vinyl acetate, 2-acrylamido-2-methylpropane sulfonic acid (AMPSA), 2-methacrylamido-2-methylpropane sulfonic acid (methAMPSA), styrene sulfonic acid, hydroxyalkyl acrylates, β-carboxyethylacrylic acid, β-sulfoalkyl (meth) acrylates, sulfoalkyl methacrylates, allyloxy-2-hydroxypropane sulfonic acid, and methacrylamido hydroxypropyl sulfonic acid, alone or in combination, and salts of such polymers.

The polymers of this invention may also be cationic, such as polymers made from dimethyldiallyl ammonium chloride (DMDAAC), diethyldiallyl ammonium chloride (DEDAC), dimethyldiallyl ammonium bromide (DMDAAB), diethyldiallyl ammonium bromide (DEDAAB), methyacryloyl-oxyethyltrimethyl ammonium chloride (METAC), acryloy-oxyethyltrimethyl ammonium chloride (AETAC), methacryloy-oxyethyltrimethyl ammonium methosulfate (METAMS), acryloyoxyethyltrimethyl ammonium methosulfate (AETAMS), methacrylamido-propyltrimethyl ammonium chloride (MAPTAC), dimethylaminoethylacrylate, dimethyl aminoethyl methacrylate, dimethylamino propylmethacrylamide, alone or in combination, and polymers made by polymerizing the above listed cationic monomers with nonionic monomers such as any of the above listed nonionic monomers, particularly acrylamide, methacrylamide or N,N-dimethylacrylamide.

Any amphoteric polymer can be used in the instant compositions, including, but are not limited to, polymers made by polymerizing one or more of the above listed anionic monomers with one or more of the above listed cationic monomers, and especially polymers made from acrylic acid, methacrylic acid and/or AMPSA or methAMPSA and DMDAAC, AETAC, METAC, METAMS, and/or MAPTAC. Optionally, nonionic monomers may be included. Also, betaine polymers can be made from N(3-sulfopropyl)-N-methacryloyloxyethyl-N,N-dimethyl ammonium betaine, alone or in combination with various nonionic monomers.

Generally, the anionic, nonionic, cationic or amphoteric polymers present in the instant water-in-oil polymer compositions have molecular weights greater than about 100,000, as determined by viscometry. Preferably, molecular weights range from about 500,000 to about 50,000,000.

The instant process involves the concentration of a starting polymer emulsion or suspension to greater than about 60% polymer solids, preferably to greater than about 70% polymer solids. The resulting polymer compositions are in a stable, pourable form, and the instant process generally does not substantially alter the properties of the polymers in the starting emulsion, particularly the molecular weight or solubility characteristics of these polymers.

The compositions produced by the instant process are novel polymer/emulsifying surfactant/hydrophobic liquid compositions which contain less than about 5%, preferably less than about 3%, and more preferably less than about 2%, based on total composition weight, water. These compositions also comprise: a) at least about 60%, by weight, a water soluble polymer, preferably at least about 70%, by weight, polymer; b) about 10 to about 35%, by weight, hydrophobic liquid; c) at least about 0.1%, by weight, of at least one emulsifying surfactant; and optionally, d) an effective amount of a steric stabilizer, all percentages being based on total composition weight.

More preferably, the instant non aqueous compositions also comprise: a) about 70–85% water soluble polymer; b) about 10 to about 25% hydrophobic liquid; c) about 0.1 to about 10% of at least one emulsifying surfactant stabilizing polymer; and d) optionally, an effective amount of a steric stabilizer. Generally, inert materials are also present.

To prepare the instant compositions, a "starting composition" which may be a polymer emulsion, dispersion or suspension, comprising an initial weight concentration of water, an initial weight concentration of a hydrophobic liquid, an initial weight concentration of at least one emulsifying surfactant, and an initial weight concentration of a water soluble polymer is dehydrated and concentrated by a process which comprises: a) diluting the starting emulsion, if the initial polymer weight concentration exceeds about 25% of said water-in-oil polymer composition, with a suitable hydrophobic liquid so as to produce a water-in-oil composition having a polymer weight concentration of from about 0.1 to about 25%, preferably from about 1 to about 15%, based on composition weight; b) dehydrating the composition of step a) by evaporating water from the water-in-oil polymer composition of step a), preferably via falling-film evaporation, thereby lowering said initial weight concentration of water to less than about 5%, preferably less than about 3%, more preferably to between about 0.1 and about 2.5% and most preferably to between about 0.1 to about 1.5%, and producing an evaporator concentrate; and c) treating the evaporator concentrate of step b) to remove some portion of the hydrophobic liquid from said evaporator concentrate, for example by filtration, evaporation or centrifugation, preferably by centrifugation, thereby producing a concentrated composition which is substantially a water soluble polymer and emulsifying surfactant suspension, dispersion or emulsion in a hydrophobic liquid, and a raffinate, preferably a centrifuge raffinate. The raffinate can optionally be treated in a second separation device such as a filter, centrifuge or evaporator, preferably a centrifuge, to capture additional polymers solids and to reclaim additional hydrophobic liquid.

The water-in-oil polymer composition containing a water soluble polymer prepared from an ethylenically unsaturated water soluble monomer or monomers to be concentrated generally should not contain an inverting surfactant, since inverting surfactants hinder effective dehydration in the evaporating step, particularly via falling-film evaporation. Aside from this limitation, it is believed that virtually any water-in-oil polymer composition can be concentrated. For example, commercially available water-in-oil emulsion polymer suspensions or emulsions can be used. As examples of commercially available water-in-oil polymer compositions, one may cite the Pol-E-Z® and HYDRAID® emulsion polymers offered by Calgon Corporation.

As indicated above, such emulsions or suspensions comprise a continuous hydrophobic liquid phase, at least one emulsifying surfactant and an aqueous phase containing water and a water soluble polymer. In the event that the starting water-in-oil polymer composition has an initial polymer weight concentration of greater than about 25%, based on the total weight of said water-in-oil polymer composition, the starting emulsion or suspension is preferably diluted with a suitable hydrophobic liquid so as to reduce the initial polymer weight concentration to below about 25%, i.e. to from about 0.1% to about 25%, preferably from about 1 to about 15%, based on total composition weight. As used herein, the term "suitable hydrophobic liquid" refers to any hydrophobic liquid which is compatible with the water-in-oil polymer composition to be concentrated. The same hydrophobic liquid that is used in the starting emulsion or suspension is preferred. If the starting water-in-oil polymer composition contains less than about 25% active polymer solids, the dilution step is generally unnecessary.

Using either a starting water-in-oil polymer composition having an initial polymer weight concentration of less than about 25%, or using a water-in-oil polymer composition which has been diluted with a suitable hydrophobic liquid so as to produce a water-in-oil polymer composition of less than about 25 weight % polymer, the instant process preferably requires dehydration via the use of a falling-film evaporator so as to remove water from the initial water-in-oil polymer composition having a polymer weight concentration of less than about 25%, thereby lowering the initial weight concentration of water to less than about 5%, preferably to less than about 3%, more preferably to between about 0.1 to about 2.5% and most preferably to between about 0.1 to about 1.5%, and producing an evaporator concentrate.

Falling-film evaporators expose the emulsion, dispersion or suspension to be concentrated to high temperatures, preferably under vacuum, which causes water to be quickly flashed off. Because residence times are typically short, the polymers so treated are not thermally punished to any substantial extent. The evaporator concentrate produced generally exits the evaporator at greater than about 200° F., which means that cooling prior to subsequent processing is preferred. Conventional heat exchange techniques can be used to cool the evaporator concentrate, preferably to less than about 150° F.

The preferred type of falling-film evaporator is a thin film evaporator. Thin film evaporators have a unique ability to handle heat-sensitive and time-at-temperature sensitive substances. In a typical thin film evaporator, the starting polymer emulsion or suspension enters the unit, which preferably but not necessarily operates under vacuum, above the thermal section and is distributed via the action of fixed clearance rotor blades. As the emulsion flows down the walls of the evaporator, a rolling fillet or bow front is generally formed on the leading edge of the blades. The turbulence and mixing action imparted to the fluid is believed to result in high heat and mass transfer rates without localized overheating. The dehydrated fluid exits the bottom of the unit, with a small fraction of vaporized oil, entrained emulsion and the water vapor exiting the top.

After the preferred cooling step, the evaporator concentrate preferably passes into a centrifuge. Though, in theory, any type of centrifuge can be used to further concentrate the evaporator concentrate, a decanter-type centrifuge is preferred for this operation.

A decanter centrifuge is characterized by a cylindrical-conical rotating bowl. The high rotational speed of the bowl develops a centrifugal force which causes the polymer solids in a composition fed to the unit to be thrown out against the bowl wall, forming an annular ring. A helical screw conveyor fits inside the bowl with a small clearance between its outer edge and the inner wall of the bowl. The conveyor rotates at either a slightly lower or higher rate than the bowl. This difference in speed, known as the differential speed, causes the separated solids to be conveyed toward the conical end of the machine where they are discharged. The lighter liquid phase overflows through ports at the opposite end of the machine.

The centrifuge should have the ability to produce a centrifugal force equivalent to from between about 500 and about 10,000 times gravity, preferably from about 1,000 to about 6,000 times gravity. The centrifugal action causes the larger, heavier polymer solids to be scrolled out of the centrifuge, thereby producing a concentrated polymer and emulsifying surfactant-in-oil composition which contains in excess of about 60% polymer solids, preferably in excess of about 70% solids, and virtually no water. This primary effluent from the centrifuge is a viscous, pourable polymer/emulsifying surfactant/hydrophobic liquid composition having a viscosity of approximately 300 cps to 25,000 cps. These compositions generally contain less than 3% water, preferably less than 2% water, based on total composition weight.

As such, these compositions are referred to as non-aqueous, high solids polymer compositions. As used herein, the term "non-aqueous" refers to polymer compositions which contain less than 5% water. Additionally, a centrifuge raffinate is produced which may be further concentrated via a concentration means such as a filter, evaporator or another centrifuge, preferably by a second centrifuge. Again, it is believed that any type of centrifuge can be used to concentrate the raffinate from the first centrifuge. However, a disk type centrifuge, preferably a partially ejecting disk centrifuge, has been found to be preferred for this second centrifugal separation. The first centrifuge raffinate generally contains less than about 5 weight % polymer solids. This stream can be concentrated via the disk centrifuge to a polymer/hydrophobic liquid composition containing in excess of about 25% polymer solids. The primary effluent from the second centrifuge can be then blended with the primary effluent from the first centrifuge to produce a final dehydrated, concentrated polymer/emulsifying surfactant/hydrophobic liquid composition having in excess of about 60 weight % polymer solids, preferably in excess of about 70% polymer solids. The oil-rich raffinate from the second centrifuge can be recycled to improve the overall efficiency of the concentration process.

After removal of some portion of the hydrophobic liquid via one or more centrifuge steps, a stabilizer is preferably added. In theory, any compound which stabilizes the concentrated polymer and emulsifying surfactant-in-oil composition by reducing its tendency to compact or separate can be used. Lauryl-methacrylate/methacrylic acid copolymers have been found to be especially effective non-aqueous polymer-in-oil suspension stabilizers. For example, 99.5/0.5 w/w lauryl-methacrylate/methacrylic acid polymers having molecular weights ranging from about 10,000 to about 5,000,000 have been found to be useful as stabilizers. An effective amount of the stabilizer should be used, preferably at least about 0.1 ppm, based on the weight of the concentrated composition to be stabilized. Such stabilizers are prepared by conventional solution polymerization techniques (see, for example, U.S. Pat. No. 4,833,198).

FIG. 1 represents a flow diagram which is believed by the inventors to represent a best mode embodiment of the instant invention. In this figure, a starting emulsion polymer containing in excess of about 25 weight % polymer solids, about 45% weight water, about 25% weight oil, and the balance inerts (i.e., the surfactant system, chelants, etc.) is stored in a Starting Emulsion Storage Tank 1. Effluent from tank 1 flows via line 3 to evaporator 4. On route, the starting polymer emulsion is diluted with suitable hydrophobic liquid from Diluent Tank 2 via line 5. The hydrophobic liquid is preferably the same hydrophobic liquid used in preparation of the starting emulsion, recycled oil from the second centrifuge step, or some combination thereof. The dilution step results in a diluted water-in-oil polymer composition containing about 10% by weight polymer, about 18% by weight water, about 70% by weight oil, and the balance inerts. An inline mixing device may be used to facilitate thorough mixing of the diluent and the starting polymer emulsion.

Evaporator 4 is a falling-film evaporator, preferably a thin film evaporator, which is heated via hot oil or steam. Hot oil or steam enters the evaporator via line 6 and exits the evaporator via line 7. Evaporator 4, which preferably operates under vacuum, causes flash evaporation and removal of sufficient water to yield an evaporator concentrate which preferably contains less than about 3% by weight water, more preferably from about 0.1 to about 1.5% water. The evaporator concentrate exits the evaporator via line 8 generally at a temperature in excess of about 220° F. The contact time in the evaporator is generally about five (5) seconds. The evaporator concentrate preferably flows into an Evaporator Concentrate Storage Tank 9. The evaporation step also generates a condenser feed stream 10 which generally contains in excess of about 80% by weight water, between about 0.5 and about 10% oil and less than about 1% inerts. The condensate feed stream 10 is cooled in heat exchanger 11 which preferably uses cooling water via line 12 to remove heat from said condensate feed stream. The cooled condensate is collected in Condensate Storage Tank 13. The evaporator concentrate flows from Evaporator Concentrate Storage Tank 9 through heat exchanger 14 into centrifuge 15. Preferably, a decanter centrifuge is used. Water is used as the cooling medium in heat exchanger 14 via lines 16. Thus, the evaporator concentrate, which preferably exits heat exchanger 14 at a temperature of less than about 120° F. and which contains about 10–15% polymer solids, less than about 3.0% water, between about 80 and about 90% oil and the balance inerts, flows to centrifuge 15. The centrifuge concentrates the evaporator concentrate by removing some portion of oil from the evaporator concentrate. A concentrated composition that is substantially a polymer and emulsifying surfactant in oil composition exits the centrifuge via line 17. This effluent from centrifuge 15 preferably contains in excess of about 70 weight % polymer solids, less than about 2 weight % water, about 8–12 weight % oil and the balance inerts. The inerts comprise, to a large extent, the surfactant system of the original emulsion. Centrifuge 15 also produces a centrifuge raffinate stream which flows via line 18 to Raffinate Storage Tank 19. The raffinate from centrifuge 15 generally contains less than about 5% polymer, and in excess of about 90% oil. The raffinate is preferably fed via line 20 to centrifuge 21, which is preferably a partially ejecting disk centrifuge. Centrifuge 21 produces a concentrate which generally contains in excess of about 25 weight % polymer, less than about 1 weight % water, between about 50 and 60 weight % oil and the balance inerts. This concentrate flows via line 22, which then joins line 17, the centrifuge 15 concentrate line, to form a concentrated polymer-in-oil composition preferably containing in excess of about 70% polymer solids, less than about 2% water, between about 15 and 25% oil, and between about 5–10% inerts. This concentrated polymer-in-oil composition flows via line 23 to Product Storage Tank 24. From Product Storage Tank 24, the concentrated polymer-in-oil composition flows through line 25, wherein a laurylmethacrylate/methacrylic acid stabilizer from Stabilizer Storage Tank 26 is added via line 27. Preferably, about 1.0 to 2.5% of stabilizer (active basis) is added, based on the weight of the centrifuge concentrate being treated. Additionally, from about 0.1 to about 0.5%, based on concentrated polymer composition weight, of inverting surfactant may be added from Storage Tank 28 via line 29 into line 30, wherein the concentrated, stabilized composition flows through static mixer 31 and into Finished Product Storage Tank 32 via line 33.

Partially ejecting disk centrifuge 21 also produces a raffinate stream which generally contains less than about 1 weight % polymer, less than about 0.1 weight % water, between about 95 and about 99.5 weight % oil and the balance inerts. This raffinate flows via line 34 to Oil Storage Tank 35. From tank 35, the centrifuge 21 raffinate is either disposed of or recycled into the process, for example to Diluent Tank 2, via pump 36.

The instant process is believed to be applicable to virtually any composition comprising a water soluble polymer in an aqueous phase which is dispersed in a continuous hydrophobic liquid phase. Preferably, however, the water-in-oil polymer composition to be concentrated should not contain an inverting surfactant, as inverting surfactants tend to interfere with dehydration efficiency.

The instant invention is also directed to the compositions produced via the instant process, to dehydrated emulsion polymer compositions produced via the use of a falling-film evaporator, particularly a thin film evaporator, and to emulsion polymer compositions resulting from the use of one or more centrifuge steps to concentrate a dehydrated emulsion or suspension via separation of its hydrophobic liquid.

EXAMPLES

The following examples are intended to further demonstrate the invention, but should not be interpreted as limiting the invention in any way.

Example I—Thin Film Evaporator

A starting polymer emulsion containing 25.45% of a 90/10 mole % acrylamide/AETAC polymer (commercially available from Calgon Corporation) was diluted using Kensol 61 to prepare a diluted water-in-oil emulsion containing the following components:

|  | Wt % |
|---|---|
| Polymer | 10.42 |
| Water | 18.12 |
| Oil | 69.80 |
| Emulsifying Surfactant System | 1.66 |
| Total | 100.00 |

This diluted starting emulsion was charged to a feed tank using an air powered diaphragm pump.

The evaporator rotor of a Votator 04-020 thin film evaporator was started, the evaporator was brought up to operating temperature using heated oil (120–130° C.) and the unit's vacuum pump was started. The operating pressure of the evaporator was 13–15 torr.

The above described diluted emulsion was then fed to the evaporator until steady state operation was established.

Based on operation of the thin film evaporator under steady state conditions, the following mass balance was obtained, based on 100 lbs. of diluted feed.

|  | Starting Emulsion | Evaporator Concentrate | Vapor Discharge |
| --- | --- | --- | --- |
| % Polymer | 10.42 | 13.15 | 0.00 |
| % Water | 18.12 | 0.30 | 84.98 |
| % oil | 69.81 | 84.42 | 14.17 |
| % Inerts* | 1.66 | 2.12 | 0.85 |
|  | 100.00 | 79.20 | 20.80 |

* Inerts include various emulsifying surfactants, sodium meta bisulfite, citric acid and the sodium salt of ethylenediamine tetracetic acid.

This example demonstrates the ability of a thin film evaporator to dehydrate a starting polymer emulsion. The evaporator concentrate produced in the above example contained 0.3%, by weight, water, which means that greater than 99.8% of the water in the starting emulsion was removed.

Example II—Decanter Centrifuge

The evaporator concentrate from Example I was fed to an Alfa-Laval/Sharples Model P-660 decanter centrifuge. This centrifuge developed centrifugal force of 3065×gravity.

The following material balance was obtained, based on 100 lbs. of centrifuge feed:

Example I

|  | Centrifuge Feed | Centrifuge Concentrate | Centrifuge Raffinate |
| --- | --- | --- | --- |
| % Polymer | 13.15 | 78.50 | 2.59 |
| % Water | 0.3 | 1.81 | 0.06 |
| % Oil | 84.42 | 11.13 | 96.28 |
| % Inerts | 2.12 | 8.56 | 1.10 |
|  | 100.00 | 13.92 | 86.08 |

The centrifuge step produced a polymer/emulsifying surfactant/hydrophobic liquid composition that contained 78.5% polymer solids and 1.81% water. This composition was a pourable polymer delivery system that is unique in the field of polymer science.

Example III—Stabilizer Addition 98.5% of centrifuge concentrate from Example II is fed through a Kinex static mixer with 1.5 gm 65% LMA/MAA copolymer. The discharge from the mixer is a stable, pourable liquid composition that contained 77.3% polymer solids.

|  | Example II Centrifuge Feed | 65% LMA/MAA Feed | Stabilized Polymer |
| --- | --- | --- | --- |
| % Polymer | 78.50 | — | 77.32 |
| % Water | 1.81 | — | 1.78 |

-continued

|  | Example II Centrifuge Feed | 65% LMA/MAA Feed | Stabilized Polymer |
| --- | --- | --- | --- |
| % oil | 11.13 | 35 | 11.49 |
| % Inerts | 8.56 | — | 8.43 |
| % LMA/MAA | — | 65 | 0.98 |

What is claimed is:

1. A method for preparing a pourable concentrated polymer/emulsifying surfactant/hydrophobic liquid composition from a starting dehydrated polymer/emulsifying surfactant/hydrophobic liquid composition, which method consists essentially of removing some portion of hydrophobic liquid from said starting dehydrated polymer/emulsifying surfactant/hydrophobic liquid composition in a first centrifuge, thereby producing a pourable concentrated polymer/emulsifying surfactant/hydrophobic liquid composition and a first centrifuge raffinate; wherein said polymer is a water soluble polymer prepared from one or more ethylenically unsaturated monomers and wherein said pourable concentrated polymer/emulsifying surfactant/hydrophobic liquid composition contains less than about 5%, by weight, water and greater than about 60%, by weight, polymer solids.

2. The method of claim 1, wherein said starting dehydrated polymer/emulsifying surfactant/hydrophobic liquid composition contains less than about 3% water.

3. The method of claim 2, wherein said starting composition contains between about 0.1 and about 2.5% water.

4. The method of claim 1, wherein said centrifuge is a decanter centrifuge.

5. The method of claim 3, wherein said centrifuge is a decanter centrifuge.

6. The method of claim 1, wherein said centrifuge raffinate is centrifuged in a second centrifuge, thereby producing a second concentrated polymer composition and a second raffinate.

7. The method of claim 4, wherein said centrifuge raffinate is centrifuged in a second centrifuge, thereby producing a second concentrated polymer composition and a second raffinate.

8. The method of claim 6, wherein said second concentrated polymer composition is blended with said, concentrated polymer/emulsifying surfactant/hydrophobic liquid composition.

9. The method of claim 7, wherein said second concentrated polymer composition is blended with said, concentrated polymer/emulsifying surfactant/hydrophobic liquid composition.

10. The method of claim 6, wherein said second centrifuge is a disc centrifuge.

11. The method of claim 7, wherein said second centrifuge is a disc centrifuge.

12. The method of claim 1, which additionally comprises adding an effective amount of a settling or compaction stabilizer to said pourable concentrated polymer/emulsifying surfactant/hydrophobic liquid composition.

13. The method of claim 1, wherein said starting dehydrated polymer/emulsifying surfactant/hydrophobic liquid composition does not contain an inverting surfactant.

14. A method for preparing a pourable, concentrated polymer/emulsifying surfactant/hydrophobic liquid composition from a starting dehydrated polymer/emulsifying surfactant/hydrophobic liquid composition, which method comprises: a) removing some portion of hydrophobic liquid from said starting dehydrated polymer/emulsifying surfactant/hydrophobic liquid composition in a first centrifuge, thereby producing a pourable concentrated polymer/emulsifying surfactant/hydrophobic liquid composition and a first centrifuge raffinate; and b) centrifuging said first centrifuge raffinate in a second centrifuge to capture additional polymer solids.

* * * * *